(12) United States Patent
Jang

(10) Patent No.: US 11,561,642 B2
(45) Date of Patent: Jan. 24, 2023

(54) TOUCH SENSING DEVICE SUPPORTING A PLURALITY OF PROTOCOLS

(71) Applicant: SILICON WORKS CO., LTD., Daejeon (KR)

(72) Inventor: Moon Ho Jang, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/111,137

(22) Filed: Dec. 3, 2020

(65) Prior Publication Data

US 2021/0191590 A1 Jun. 24, 2021

(30) Foreign Application Priority Data

Dec. 24, 2019 (KR) .................. 10-2019-0173741

(51) Int. Cl.
*G06F 3/041* (2006.01)
*G06F 3/0354* (2013.01)

(52) U.S. Cl.
CPC ...... *G06F 3/04162* (2019.05); *G06F 3/03545* (2013.01); *G06F 2203/04108* (2013.01)

(58) Field of Classification Search
CPC .. G06F 3/0412; G06F 3/0445; G06F 3/04162; G06F 3/03545; G06F 2203/041
See application file for complete search history.

(56) References Cited

U.S. PATENT DOCUMENTS

| 10,185,454 B2 | 1/2019 | Chandran et al. | |
| 2020/0174589 A1* | 6/2020 | Hara | ........... G06F 3/04162 |
| 2020/0201505 A1* | 6/2020 | Jung | ........... G06F 3/0414 |

FOREIGN PATENT DOCUMENTS

| KR | 10-2018-0046338 A | 5/2018 |
| KR | 10-2019-0038026 A | 4/2019 |

* cited by examiner

*Primary Examiner* — Lisa S Landis
(74) *Attorney, Agent, or Firm* — Fenwick & West LLP

(57) ABSTRACT

In an embodiment, various active pens may be searched for in every frame, so that various active pens may operate in a touch sensing system.

7 Claims, 11 Drawing Sheets

FIG. 4
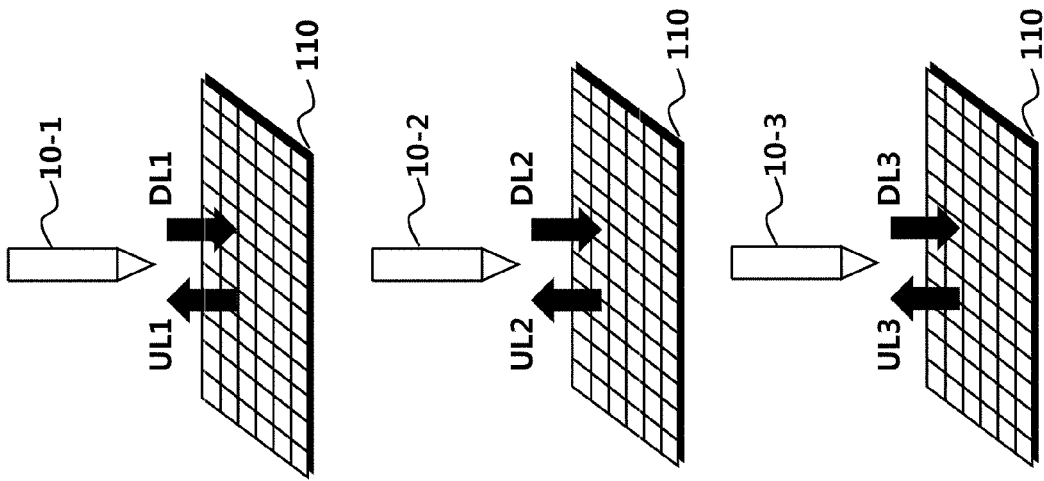
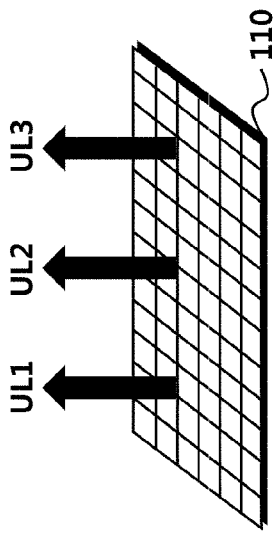

TOUCH SENSING DEVICE SUPPORTING A PLURALITY OF PROTOCOLS

CROSS REFERENCE TO RELATED APPLICATION

This application claims priority from Republic of Korea Patent Application No. 10-2019-0173741, filed on Dec. 24, 2019, which is hereby incorporated by reference in its entirety.

BACKGROUND

1. Field of Technology

The present disclosure relates to a technology for sensing a touch or a proximity of an active pen to a touch panel and a display device therefor.

2. Description of the Prior Art

A technology for perceiving a touch or the proximity of an external object to a touch panel is called a touch sensing technology. In an electronic apparatus using such a technology, a touch panel is positioned in the same plane as that of a display panel, and accordingly, a user may input user operation signals into a touch panel while the user looks at images on a display panel. Such a method of generating user operation signals is remarkably intuitive for users compared with previous other user operation signal input types, such as a mouse input type or a keyboard input type.

For such advantages, the touch sensing technology is applied to various electronic apparatuses comprising display panels. A touch sensing device may sense a touch or the proximity of an external object to a touch panel by supplying a driving signal to a driving electrode disposed in the touch panel and receiving a response signal formed in a sensing electrode disposed therein. Here, a capacitance is formed between the driving electrode and the sensing electrode and the change of the capacitance may indicate a touch or the proximity of the external object to the touch panel.

A user may use a finger as well as an active pen in order to input a user operation signal. A process of data communication between an active pen and a touch sensing device may be as follows. When a touch sensing device transmits an uplink signal that may be perceived by an active pen, the active pen receives the uplink signal so as to perceive the touch sensing device. Then, when the active pen transmits a downlink signal that may be perceived by the touch sensing device, the touch sensing device may receive the downlink signal so as to perceive the active pen.

However, such a process is restricted to a case when a touch sensing device operates with one kind of active pen. When there are various active pens, this process cannot be applied as it is. In other words, in a case when a touch sensing device operates with various active pens, the process, of transmission and reception of an uplink signal and a downlink signal, needs to be changed. Therefore, the present disclosure will describe a technology in which a touch sensing device operates with various active pens.

SUMMARY

In an aspect, the present disclosure is to provide a method of a touch sensing device's searching one of various active pens in each frame.

In another aspect, the present disclosure is to provide a method of a touch sensing device's receiving a downlink signal from one of various active pens in each frame.

To this end, in an aspect, the present disclosure provides a touch sensing device, for sensing a touch or the proximity of one of various active pens, comprising: a driving circuit to transmit an uplink signal to one of various active pens through a touch electrode; and a sensing circuit to wait to receive a downlink signal corresponding to the uplink signal through the touch electrode in order to search one of various active pens, wherein the sensing circuit searches one of the various active pen or all the various active pens in each frame.

In the touch sensing device, in a case when searching all the various active pens in each frame, the sensing circuit may sequentially search the various active pens.

In the touch sensing device, the sensing circuit may search a first group of various active pens in a first frame and then a second group of various active pens different from the first group in a second frame.

In the touch sensing device, the sensing circuit may sequentially search the first group of various active pens in the first frame and may sequentially search the second group of various active pens in the second frame.

In the touch sensing device, when the driving circuit transmits an uplink signal for one active pen in a frame, the sensing circuit may wait to receive a downlink signal corresponding to the uplink signal from the one active pen in each frame.

In the touch sensing device, when the driving circuit transmits uplink signals for all the various active pens in a frame, the sensing circuit may wait to receive downlink signals respectively corresponding to the uplink signals from all the various active pens in each frame.

In the touch sensing device, an uplink signal may comprise uplink information exclusively for a kind of active pens and the sensing circuit may search an active pen that receives the uplink information.

In the touch sensing device, uplink information exclusively for each kind of active pens may be determined according to a data communication protocol for each kind of active pens.

In the touch sensing device, the sensing circuit may receive a downlink signal from the active pen that receives the uplink information.

In the touch sensing device, the sensing circuit may receive a synchronization signal indicating display time sections and touch time sections and search one active pen or all the various active pens in each frame in some touch time sections.

In the touch sensing device, the driving circuit may transmit uplink signals in another touch time sections.

In the touch sensing device, downlink information exclusively for each kind of active pens may be determined according to a data communication protocol for each kind of active pens.

In another aspect, the present disclosure provides a touch sensing device comprising: a driving circuit to transmit a first uplink signal corresponding to a first protocol through a touch electrode in a first touch time section and to transmit a second uplink signal corresponding to a second protocol through the touch electrode in a second touch time section in one frame comprising a plurality of display time sections and a plurality of touch time sections; and a sensing circuit to wait to receive a first downlink signal corresponding to the first uplink signal in a third touch time section according to a downlink signal timing defined by the first protocol and to wait to receive a second downlink signal corresponding to the second uplink signal in a fourth touch time section according to a downlink signal timing defined by the second protocol.

The one frame may comprise 16 touch time sections. According to the first protocol, downlink signals may be transmitted and received in N (N is a natural number which is 2 or higher) of the 16 touch time sections, and according to the second protocol, downlink signals may be transmitted and received in M (M is a natural number which is 2 or higher) of the 16 touch time sections. The third touch time section may be selected among the N touch time sections and the fourth touch time section may be selected among the M touch time sections to not overlap with the third touch time section.

The driving circuit may transmit the first uplink signal in the same touch time section in the respective frames and the second uplink signal in the same touch time section in the respective frames.

When the sensing circuit receives the first downlink signal in the third touch time section, the driving circuit and the sensing circuit may operate according to the first protocol in the subsequent frames.

The downlink signal timing according to the first protocol may be different from the downlink signal timing according to the second protocol.

In another frame, the driving circuit may transmit a third uplink signal corresponding to a third protocol in one touch time section and a fourth uplink signal corresponding to a fourth protocol in another touch time section, and the sensing circuit may wait to receive a third downlink signal corresponding to the third uplink signal according to a downlink signal timing defined by the third protocol and to receive a fourth downlink signal corresponding to the fourth uplink signal according to a downlink signal timing defined by the fourth protocol.

The first uplink signal and the second uplink signal may have different data formats and/or communication frequencies.

Each frame may comprise 16 touch time sections and the sensing circuit may sense a touch or the proximity of an external object to a panel in some of the 16 touch time sections.

In still another aspect, the present disclosure provides a touch sensing device comprising: a driving circuit to transmit a first uplink signal according to a first protocol in a first frame and to transmit a second uplink signal according to a second protocol different from the first protocol in a second frame subsequent to the first frame; and a sensing circuit to wait to receive a first downlink signal corresponding to the first uplink signal according to a downlink signal timing defined by the first protocol in the first frame and to wait to receive a second downlink signal corresponding to the second uplink signal according to a downlink signal timing defined by the second protocol in the second frame.

The driving circuit may transmit the first uplink signal in two or more touch time sections in the first frame and the second uplink signal in two or more touch time sections in the second frame.

When the sensing circuit receives the first downlink signal in the first frame, the driving circuit and the sensing circuit may operate according to the first protocol in the second frame.

The driving circuit may repeat the alternate transmission of the first uplink signal and the second uplink signal in every predetermined frame period.

The driving circuit may transmit a third uplink signal according to a third protocol different from the first protocol the second protocol in a third frame subsequent to the second frame and the sensing circuit may wait to receive a third downlink signal corresponding to the third uplink signal according to a downlink signal timing defined by the third protocol in the third frame.

The first uplink signal and the second uplink signal may have different data formats and/or communication frequencies and/or downlink signal timings.

Each frame may comprise 16 touch time sections and the sensing circuit may sense a touch or the proximity of an external object to a panel in some of the 16 touch time sections.

As described above, the present disclosure allows various active pens to operate in a touch sensing system.

BRIEF DESCRIPTION OF THE DRAWINGS

FIG. 4 is a diagram for illustrating the transmission and the reception between one of various active pens and a panel according to an embodiment;

DETAILED DESCRIPTION

Figure 1:
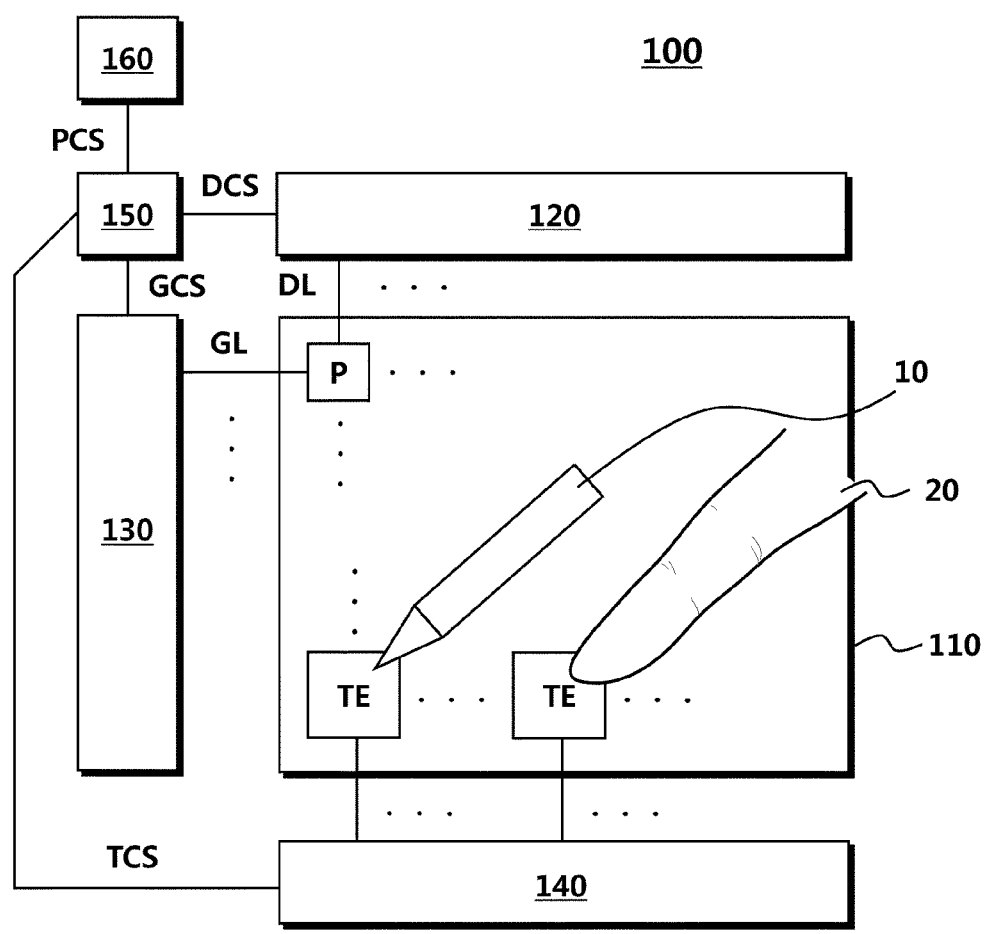
FIG. 1 is a configuration diagram of a display device according to an embodiment.

FIG. 1 is a configuration diagram of a display device according to an embodiment.

Referring to FIG. 1, a display device 100 may comprise a panel 110, a data driving device 120, a gate driving device 130, a touch sensing device 140, a data processing device 150, and a host 160.

A driving device comprising at least one of the data driving device 120, the gate driving device 130, the touch sensing device 140, and the data processing device 150 may be referred to as a display driving device. For example, the data driving device 120 may be referred to as a display driving device or a driving device comprising the data driving device 120 and the touch sensing device 140 may be referred to as a display driving device. A driving device may be included in another driving device. For example, the data driving device 120 may be included in the touch sensing device 140. Or, the gate driving device 130 may be included in the data driving device 120. Depending on embodiments, some components of a driving device may be included in another device.

The data driving device 120 may drive a data line DL connected with a pixel P and the gate driving device 130 may drive a gate line GL connected with a pixel P. The touch sensing device 140 may drive a touch electrode TE disposed in the panel 110.

The data driving device 120 may supply a data voltage through a data line DL in order to display an image in each pixel P. The data driving device 120 may comprise at least one data driver integrated circuit, and this at least one data driver integrated circuit may be connected to a bonding pad of the display panel 150 in a tape automated bonding (TAB) type or a chip-on-glass (COG) type, directly formed on the display panel 150, or integrated on the display panel 150 depending on cases. In addition, the data driving device 170 may be formed in a chip-on-film (COF) type.

The data driving device 120 may receive image data and a data control signal DCS from the data processing device 150. The data driving device 120 may generate a data voltage according to a greyscale value for each pixel indicated by image data and drive each pixel.

The data control signal DCS may include at least one synchronization signal. For example, the data control signal DCS may include a vertical synchronization signal VSYNC, a horizontal synchronization signal HSYNC, a time division signal, and the like. The data driving device 120 may separate a frame according to a vertical synchronization signal VSYNC, and may drive each pixel in periods other than a vertical blank period indicated by the vertical synchronization signal VSYNC. The data driving device 120 may identify image data for each horizontal line according to the horizontal synchronization signal HSYNC, and may supply a data voltage to each horizontal line. The data driving device 120 may separate a display period and a touch period according to the time division signal, and may drive each pixel in the display period.

The gate driving device 130 may supply scan signals to the gate lines GL in order to turn on and off a transistor located in each pixel P. The gate driving device 130 may be positioned at only one side of the panel 110 as shown in FIG. 1, or two split gate driving devices may be positioned at both sides of the panel 110, according to a driving method. In addition, the gate driving device 130 may include at least one gate driver integrated circuit, and the at least one gate driver integrated circuit may be connected to a bonding pad of the panel 110 by a tape-automated bonding (TAB) type or a chip-on-glass (COG) type, or may be implemented as a GIP (gate-in-panel) type so as to be formed directly on the panel 110. In some cases, the gate driver integrated circuit may be integrated to be formed on the panel 110. In addition, the gate driving device 130 may be implemented as a chip-on-film (COF) type.

The gate driving device 130 may receive a gate control signal GCS from the data processing device 150. The gate control signal GCS may include a plurality of clock signals. In addition, the gate driving device 130 may generate scan signals using the clock signals, and may supply the scan signals to the gate lines GL.

The panel 110 may include a display panel, and may further include a touch panel (e.g., a touch screen panel (TSP)). Here, the display panel and the touch panel may share some elements with each other. For example, a touch electrode TE for sensing a touch on the touch panel may be used as a common electrode to which a common voltage is supplied in the display panel (in the case where the display panel is an LCD (liquid crystal display) panel). As another example, the touch electrode TE may be used as a cathode electrode to which a base voltage VSS is supplied in the display panel (in the case where the display panel is an OLED (organic light-emitting diode) panel). Such a panel 110 may be called "integrated panel", considering that some elements of the display panel and the touch panel are shared with each other, but the present disclosure is not limited thereto. In addition, an in-cell type panel in which the display panel and the touch panel are integrally combined is known, but this is only an example of the above-described panel 110, and the panel to which the present disclosure is applied is not limited to the in-cell type panel.

Meanwhile, a plurality of touch electrodes TE may be arranged on the panel 110, and the touch sensing device 140 may drive the touch electrodes TE using touch driving signals. In addition, the touch sensing device 140 may generate a sensing value for a touch electrode TE according to a response signal generated in the touch electrode TE in response to the driving signal. In addition, the touch sensing device 140 may calculate the touch coordinates of an object 20 using sensing values of a plurality of touch electrodes TE arranged in the panel 110, and the calculated touch coordinates may be transmitted to other devices (e.g., a host), and may be used therein.

The touch sensing device 140 may transmit and receive signals to and from the active pen 10 through the touch electrode TE. The touch sensing device 140 may supply an uplink signal to the touch electrode TE, and the active pen 10 may receive the uplink signal through the contact with the touch electrode TE. The uplink signal may include, for example, information such as panel information, protocol version, and the like, a synchronization signal, and the like. The active pen 10 may receive the uplink signal, and may identify information on the panel or the version of the protocol, and may perform synchronization of signals.

The active pen 10 may transmit a downlink signal to the touch electrode TE. In addition, the touch sensing device 140 may receive a downlink signal through the touch electrode TE. The downlink signal may include state information on the active pen. The state information on the active pen may include, for example, the position of the active pen, the button state of the active pen, the battery state of the active pen, the tilt of the active pen, and the like.

The touch sensing device 140 may receive a touch control signal TCS from the data processing device 150. The touch control signal TCS may include at least one synchronization signal. For example, the touch control signal TCS may include a vertical synchronization signal VSYNC, a time division signal, a touch synchronization signal TSYNC, and the like. The touch sensing device 140 may separate a display period and a touch period according to the time division signal or the touch synchronization signal TSYNC, and may drive the touch electrode TE in the touch period.

The synchronization signals may be of the same signal, or may be of different signals according to an embodiment. For example, the time division signal may be the same as the touch synchronization signal, or may be different from the same. Hereinafter, a description may be made using specific names in order to emphasize specific functions thereof, but the description is not limited to the specific names.

The synchronization signals may be generated on the basis of panel control signals PCS that is originally supplied from the host 160 to the data processing device 150.

The host 160 may transmit image data to the data processing device 150, and may transmit a vertical synchronization signal VSYNC for separating image data by frames. The data processing device 150 may generate a time division signal, a touch synchronization signal TSYNC, and the like on the basis of the vertical synchronization signal VSYNC, and may transmit the same to each of the driving devices 120, 130, and 140.

Figure 2:
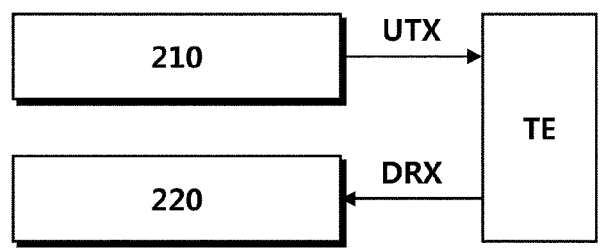
FIG. 2 is a configuration diagram of a touch sensing device according to an embodiment.

FIG. 2 is a diagram illustrating the configuration of a touch sensing device according to an embodiment.

Referring to FIG. 2, a touch sensing device 140 may include a driving unit 210 and a sensing unit 220 in one embodiment.

The driving unit 210 may supply an uplink transmission signal UTX to the touch electrode TE in a first time period. Here, the uplink transmission signal UTX is an uplink signal generated in the touch electrode TE. The uplink signal generated in the active pen may be referred to as an "uplink reception signal".

The sensing unit 220 may receive a downlink reception signal DRX from the touch electrode TE in a second time period, which does not overlap the first time period. Here, the downlink reception signal DRX is a downlink signal generated in the touch electrode TE. The downlink signal generated in the active pen may be referred to as a "downlink transmission signal."

The touch electrode TE may be a common electrode to which a common voltage is supplied in an LCD panel. Alternatively, the touch electrode TE may be a cathode electrode in an OLED panel.

Figure 3:
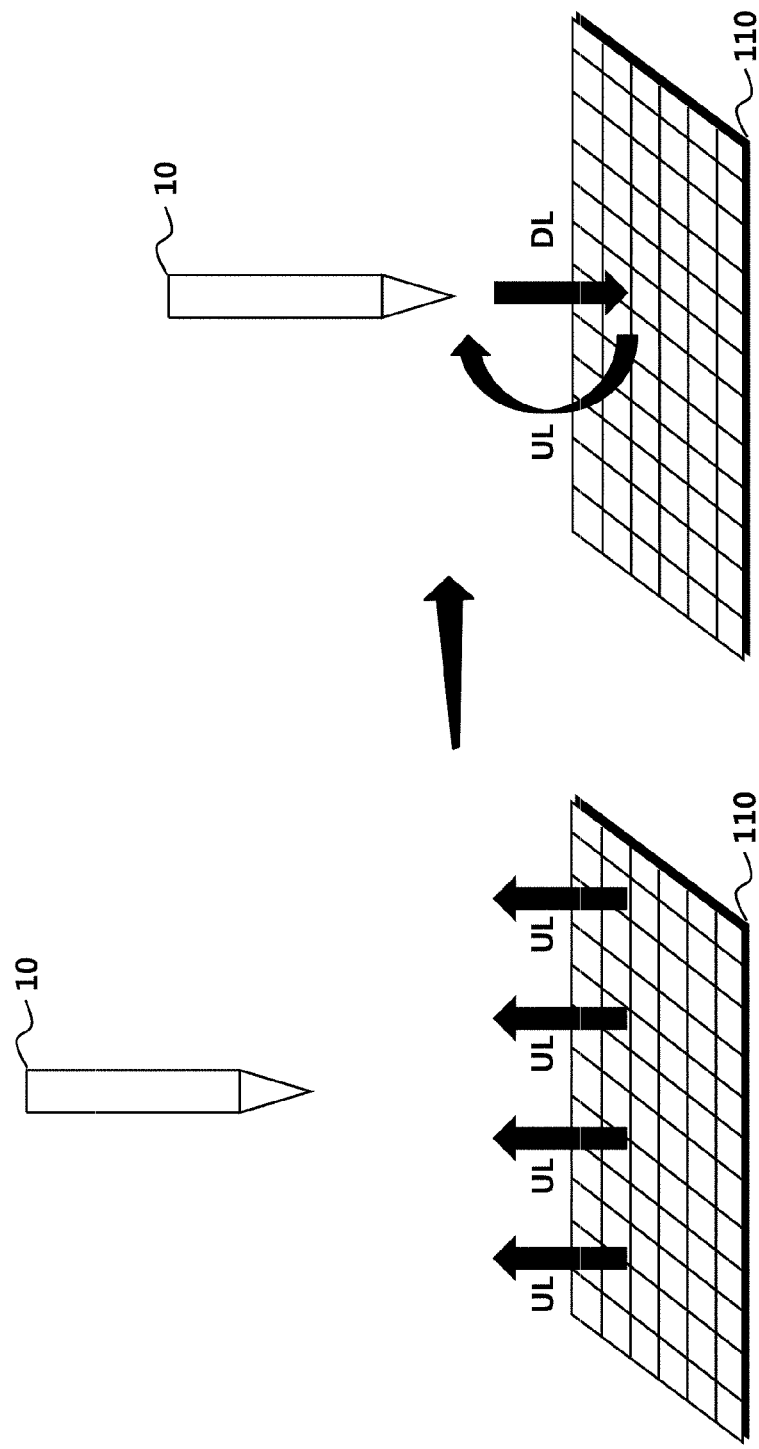
FIG. 3 is a diagram for illustrating the transmission and the reception between an active pen and a panel according to an embodiment.

FIG. 3 is a diagram illustrated in order to describe an operation in which an active pen 10 and a panel 110 exchange link signals with each other.

Referring to FIG. 3, a process of transmitting and receiving link signals between an active pen 10 and a panel 110 is illustrated.

The driving unit of the touch sensing device may transmit uplink signals UL to the active pen 10 through touch electrodes. If the active pen 10 touches the panel 110 including touch electrodes or approaches the same within a certain distance, the active pen 10 may receive an uplink signal UL. The uplink signal UL may be transmitted to the active pen 10 through a portion or the entirety of the panel 110.

The sensing unit of the touch sensing device may receive a downlink signal DL from the active pen 10 through the touch electrode. Upon receiving an uplink signal UL, the active pen 10 may transmit a downlink signal DL. The downlink signal DL may be transmitted to the touch electrode positioned at the point that the active pen touches or approaches.

If the downlink signal DL is supplied to the touch sensing device, the touch sensing device may continuously transmit and receive data to and from the active pen 10. If the downlink signal DL is no longer supplied to the touch sensing device at a certain time, the touch sensing device may search for the active pen again. That is, the touch sensing device may repeat the above process by retransmitting uplink signals UL to the active pen.

FIG. 4 is a diagram illustrated in order to describe an operation in which various active pens and a panel exchange link signals according to an embodiment.

Referring to FIG. 4, a process of transmitting and receiving link signals between various active pens 10-1, 10-2, 10-3 and a panel 110 according to an embodiment is illustrated. Hereinafter, although three active pens 10-1, 10-2, and 10-3 will be described as touching or approaching the panel 110 by way of example, the present disclosure is not limited thereto.

The driving unit of the touch sensing device may transmit uplink signals to various active pens 10-1, 10-2, 10-3. The driving unit may independently transmit uplink signals for various active pens at different times. For example, the driving unit may transmit a first uplink signal UL1 to a first active pen 10-1, a second uplink signal UL2 to a second active pen 10-2, and a third uplink signal UL3 to a third active pen 10-3, respectively. Here, the driving unit may transmit the first uplink signal UL1 to the first active pen 10-1 at a first timing, and may transmit the second uplink signal UL2 to the second active pen 10-2 at a second timing, which is different from the first timing. The driving unit may not transmit the first uplink signal UL1 and the second uplink signal UL2 at the same timing.

The sensing unit of the touch sensing device may wait to receive downlink signals corresponding to the uplink signals through the touch electrodes, thereby searching for various active pens. If a downlink signal is received for the first time during the searching for various active pens, the sensing unit may continuously receive downlink signals subsequent thereto from the active pen that transmitted the first downlink signal.

The sensing unit may independently search for various active pens at different times. For example, the sensing unit may wait to receive a first downlink signal DL1 from the first active pen 10-1, may wait to receive a second downlink signal DL2 from the second active pen 10-2, and may wait to receive a third downlink signal DL3 from the third active pen 10-3, respectively. Here, the sensing unit may wait to receive the first downlink signal DL1 at a first timing, and may wait to receive the second downlink signal DL2 at a second timing, which is different from the first timing. The sensing unit may not search for the first active pen 10-1 and the second active pen 10-2 at the same timing.

In order to search for various active pens at different times, the sensing unit may search for one active pen among the various active pens in every frame, or may search for all of the various active pens in every frame. The sensing unit may use one of a first scheme of intensively searching for one active pen in one frame, a second scheme of evenly searching for various active pens in one frame, and a third scheme of evenly searching for some active pens in one frame and evenly searching for some other active pens in another frame (a combination of the first scheme and the second scheme).

If the downlink signal is supplied to the touch sensing device from one active pen among the various active pens, the touch sensing device may continuously transmit and receive data to and from the one active pen. If the downlink signal is no longer supplied to the touch sensing device at a certain time, the touch sensing device may search for various active pens again. That is, the touch sensing device may repeat the above process by retransmitting uplink signals to the various active pens.

Figure 5:
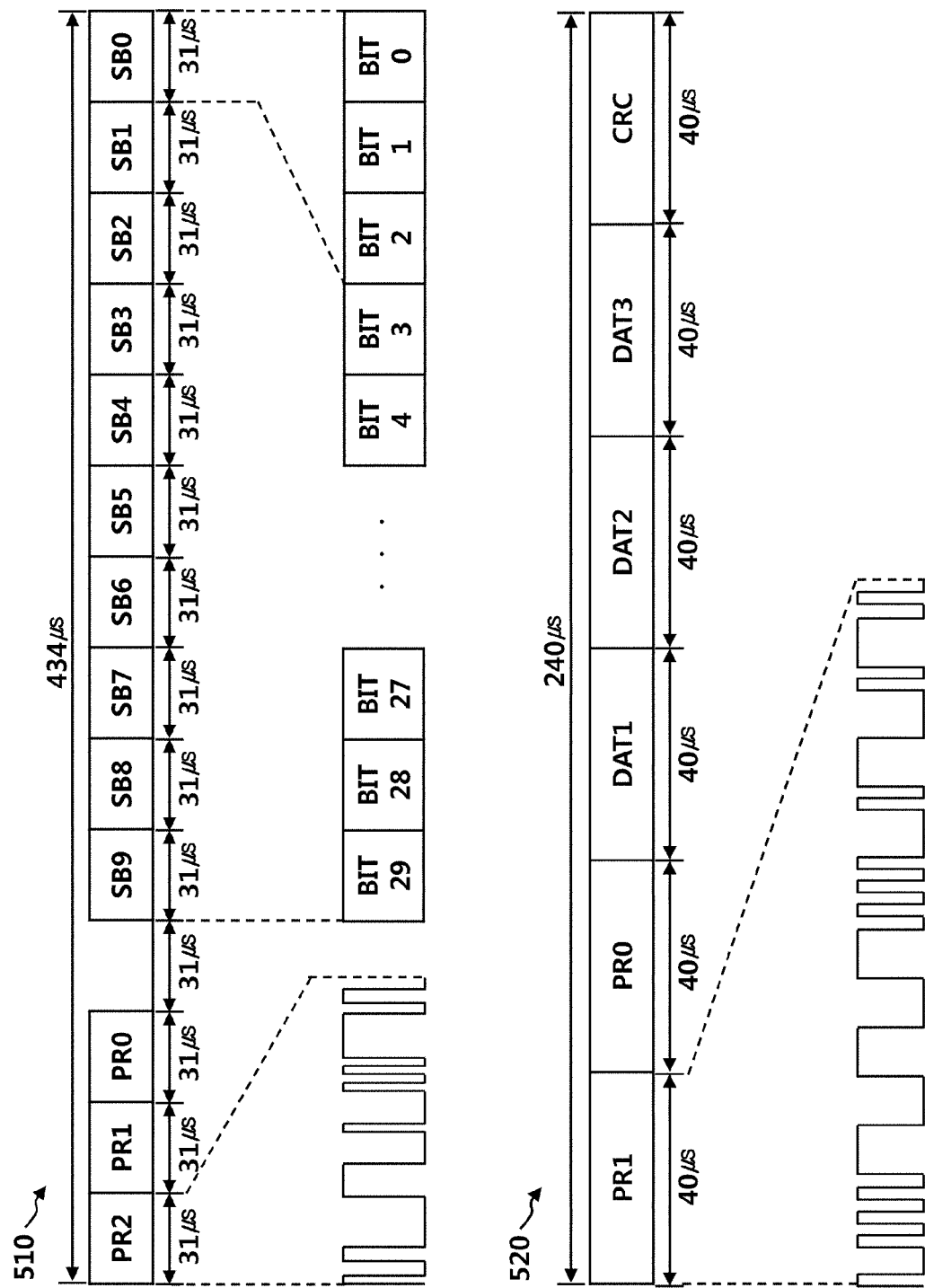
FIG. 5 is a diagram for illustrating uplink information exclusively for one kind of active pen in an uplink signal according to an embodiment.

FIG. 5 is a diagram illustrated in order to describe unique uplink information of an uplink signal according to an embodiment.

Referring to FIG. 5, the uplink signals transmitted from the touch sensing device to various active pens may include unique uplink information. The uplink information may determine a transmission and reception method such as a format, a frequency, or a timing of an uplink signal, and, typically, may include a protocol. The uplink information may differ depending on the various active pens, and may include different protocols depending on the various active pens. The uplink information may be differently configured by the manufacturer of the active pen.

For example, a first uplink signal for a first active pen may include first uplink information 510. The first uplink information 510 may be a protocol of the first uplink signal. The first uplink information 510 may include three preambles PR0 to PR2, one space, and ten symbols SB0 to SB9. Each preamble may include a logic level indicating information on the start and the end of the first uplink signal. Each symbol includes three bits, and the whole symbols may include a total of 30 bits BIT0 to BIT29. In addition, the first uplink information 510 may have a total signal duration of 434 µs, and may have a preamble signal duration and a symbol signal duration of 31 µs. In addition, the first uplink signal may be transmitted at a frequency of 500 kHz through the first uplink information 510.

In addition, a second uplink signal for a second active pen may include second uplink information 520. The second uplink information 520 may be a protocol of the second uplink signal. The second uplink information 520 may include two preambles PR0 to PR1, three data periods DAT1 to DAT3, and one cyclic redundancy check (CRC) period. Each preamble may include a logic level indicating information on the start and the end of the second uplink signal. In addition, the second uplink information 520 may have a total signal duration of 240 µs, and may have a preamble signal duration, a data period signal duration, and a CRC period signal duration of 40 µs. In addition, the second uplink signal may be transmitted at a frequency of 500 kHz through the second uplink information 520.

Various active pens may recognize only the uplink signal having unique uplink information. In order to search for a target active pen, the touch sensing device may be required to transmit an uplink signal having unique uplink information, which is able to be recognized by the target active pen, to the target active pen.

Figure 6:
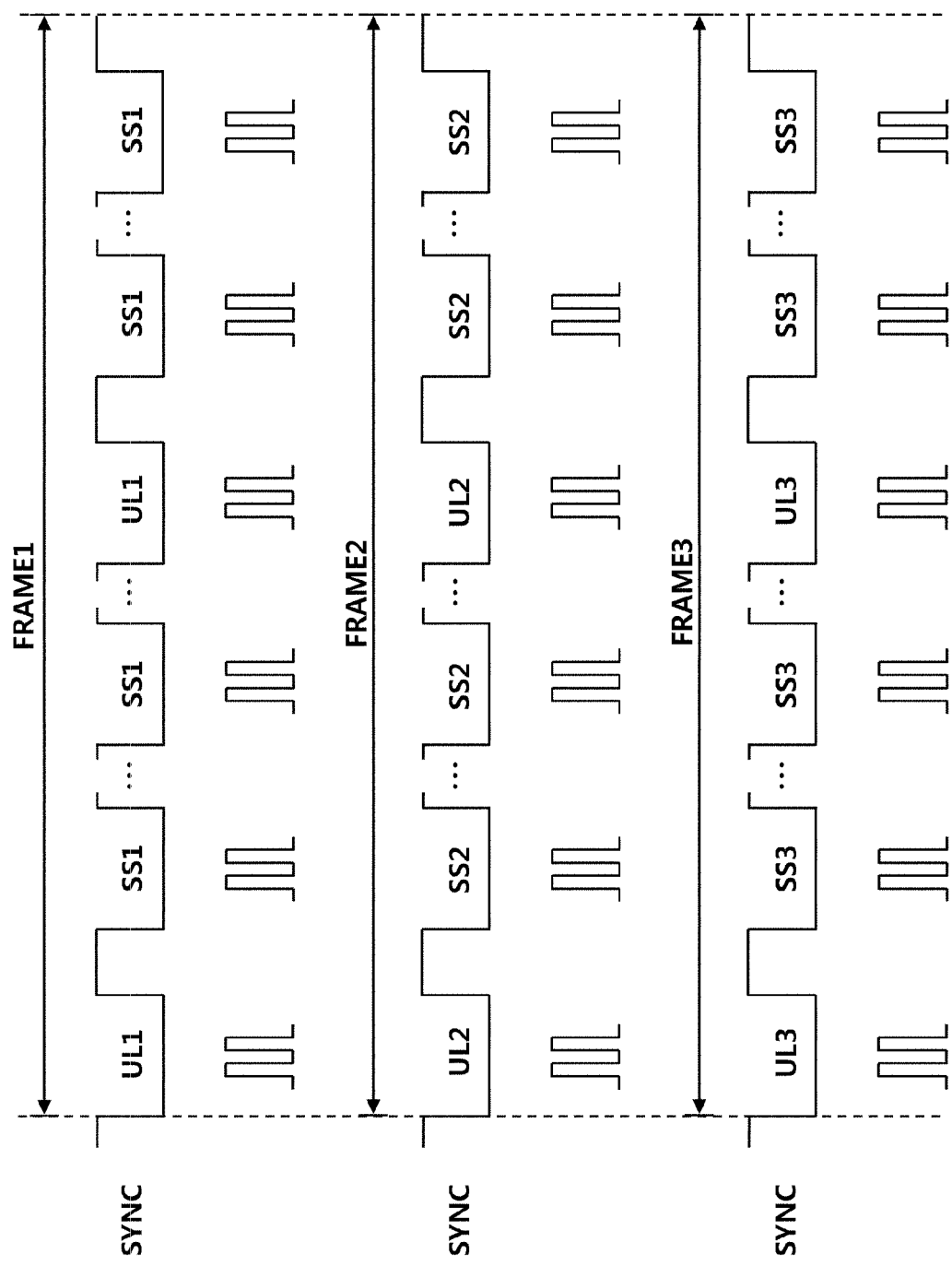
FIG. 6 is a diagram for illustrating a first method of searching for various active pens using uplink signals according to an embodiment.

FIG. 6 is a diagram illustrated in order to describe a first scheme of searching for various active pens using an uplink signal according to an embodiment.

Referring to FIG. 6, a touch sensing device according to an embodiment may search for various active pens by a first scheme indicating serial searching or sequential searching.

The sensing unit of the touch sensing device may search for only one active pen among various active pens in every frame. The synchronization signal SYNC may determine a touch period for sensing a touch. The touch sensing device may receive a synchronization signal SYNC, and may operate in the touch period according to the synchronization signal SYNC. FIG. 6 illustrates only touch periods, omitting display periods, and the operation in each touch period, wherein each operation is illustrated as a waveform in the corresponding touch period.

For example, the sensing unit may search for only a first active pen among first to third active pens in a first frame FRAME1. After transmitting a first uplink signal UL1, the sensing unit may search for the first active pen in two subsequent touch periods (SS1). The sensing unit may wait to receive a downlink signal from the first active pen. The sensing unit may repeat the transmission of the first uplink signal UL1 and the searching for the first active pen (SS1) according to the duration of the first frame FRAME1.

Subsequently, the sensing unit may search for only a second active pen among the first to third active pens in a second frame FRAME2. After transmitting a second uplink signal UL2, the sensing unit may search for the second active pen in two subsequent touch periods (SS2). The sensing unit may wait to receive a downlink signal from the second active pen. The sensing unit may repeat the transmission of the second uplink signal UL2 and the searching for the second active pen (SS2) according to the duration of the second frame FRAME2.

Subsequently, the sensing unit may search for only a third active pen among the first to third active pens in a third frame FRAME3. After transmitting a third uplink signal UL3, the sensing unit may search for the third active pen in two subsequent touch periods (SS3). The sensing unit may wait to receive a downlink signal from the third active pen. The sensing unit may repeat the transmission of the third uplink signal UL3 and the searching for the third active pen (SS3) according to the duration of the third frame FRAME3.

Figure 7:
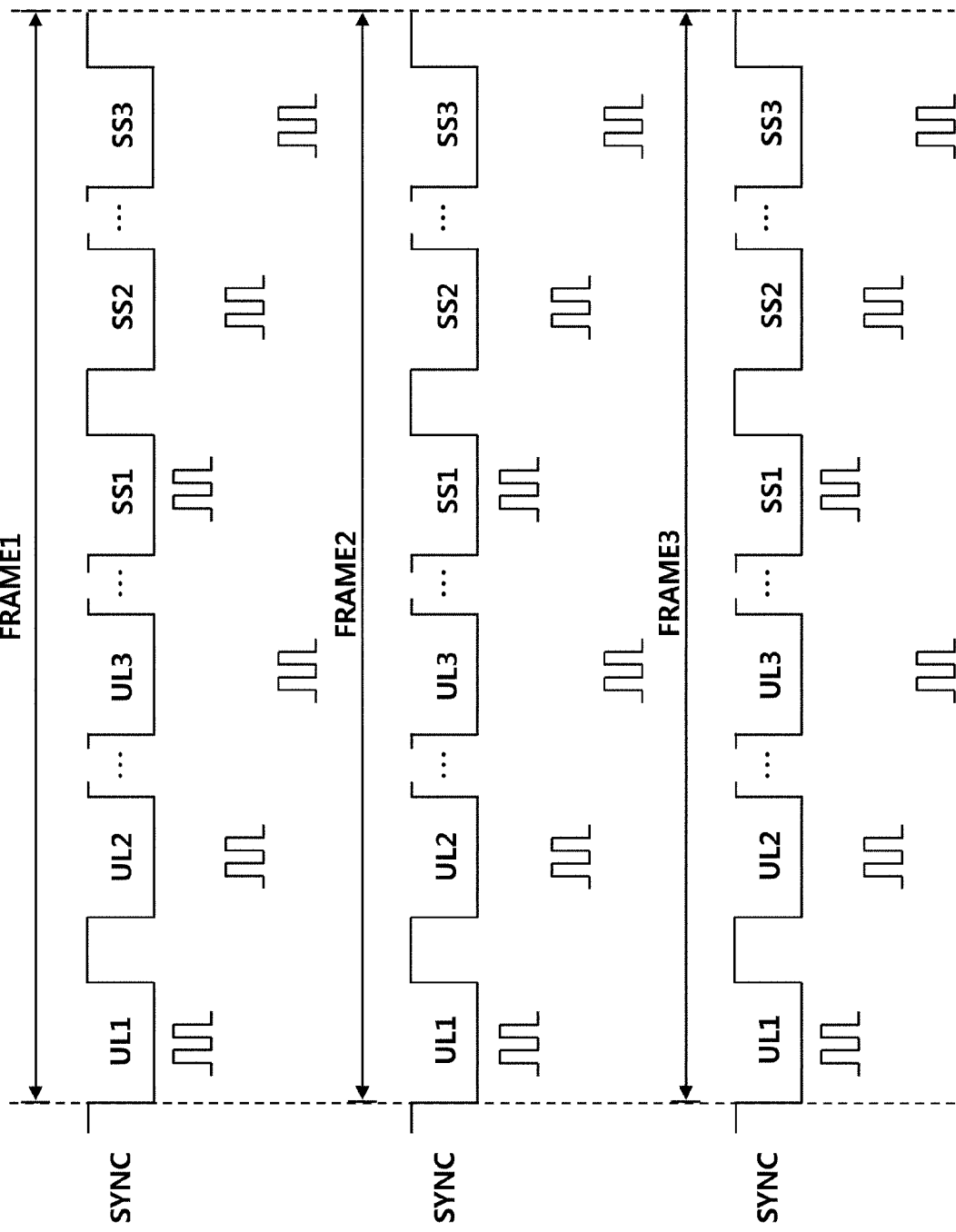
FIG. 7 is a diagram for illustrating a second method of searching for various active pens using uplink signals according to an embodiment.

FIG. 7 is a diagram illustrated in order to describe a second scheme of searching for various active pens using an uplink signal according to an embodiment.

Referring to FIG. 7, a touch sensing device according to an embodiment may search for various active pens by a second scheme indicating parallel searching.

The sensing unit of the touch sensing device may search for all of the various active pens in every frame. In this case, the sensing unit may search for various active pens in sequence or in a predetermined sequence in every frame.

For example, the sensing unit may search for all of first to third active pens in a first frame FRAME1. After sequentially transmitting first to third uplink signals UL1 to UL3, the sensing unit may search for the first to third active pens in a plurality of subsequent touch periods (SS1 to SS3). The sensing unit may wait to sequentially receive downlink signals from the first to third active pens. The sensing unit may repeat the transmission of the first to third uplink signals UL1 to UL3 and the searching for the first to third active pens (SS1 to SS3) according to the duration of the first frame FRAME1.

Subsequently, the sensing unit may search for all of the first to third active pens in a second frame FRAME2. After sequentially transmitting first to third uplink signals UL1 to UL3, the sensing unit may search for the first to third active pens in a plurality of subsequent touch periods (SS1 to SS3). The sensing unit may wait to sequentially receive downlink signals from the first to third active pens. The sensing unit may repeat the transmission of the first to third uplink signals UL1 to UL3 and the searching for the first to third active pens (SS1 to SS3) according to the duration of the second frame FRAME2.

Subsequently, the sensing unit may search for all of the first to third active pens in a third frame FRAMES. After sequentially transmitting first to third uplink signals UL1 to UL3, the sensing unit may search for the first to third active pens in a plurality of subsequent touch periods (SS1 to SS3). The sensing unit may wait to sequentially receive downlink signals from the first to third active pens. The sensing unit may repeat the transmission of the first to third uplink signals UL1 to UL3 and the searching for the first to third active pens (SS1 to SS3) according to the duration of the third frame FRAME3.

Here, the order of transmitting the first to third uplink signals UL1 to UL3 and searching for the first to third active pens (SS1 to SS3) may differ in a single frame or in every frame.

Figure 8:
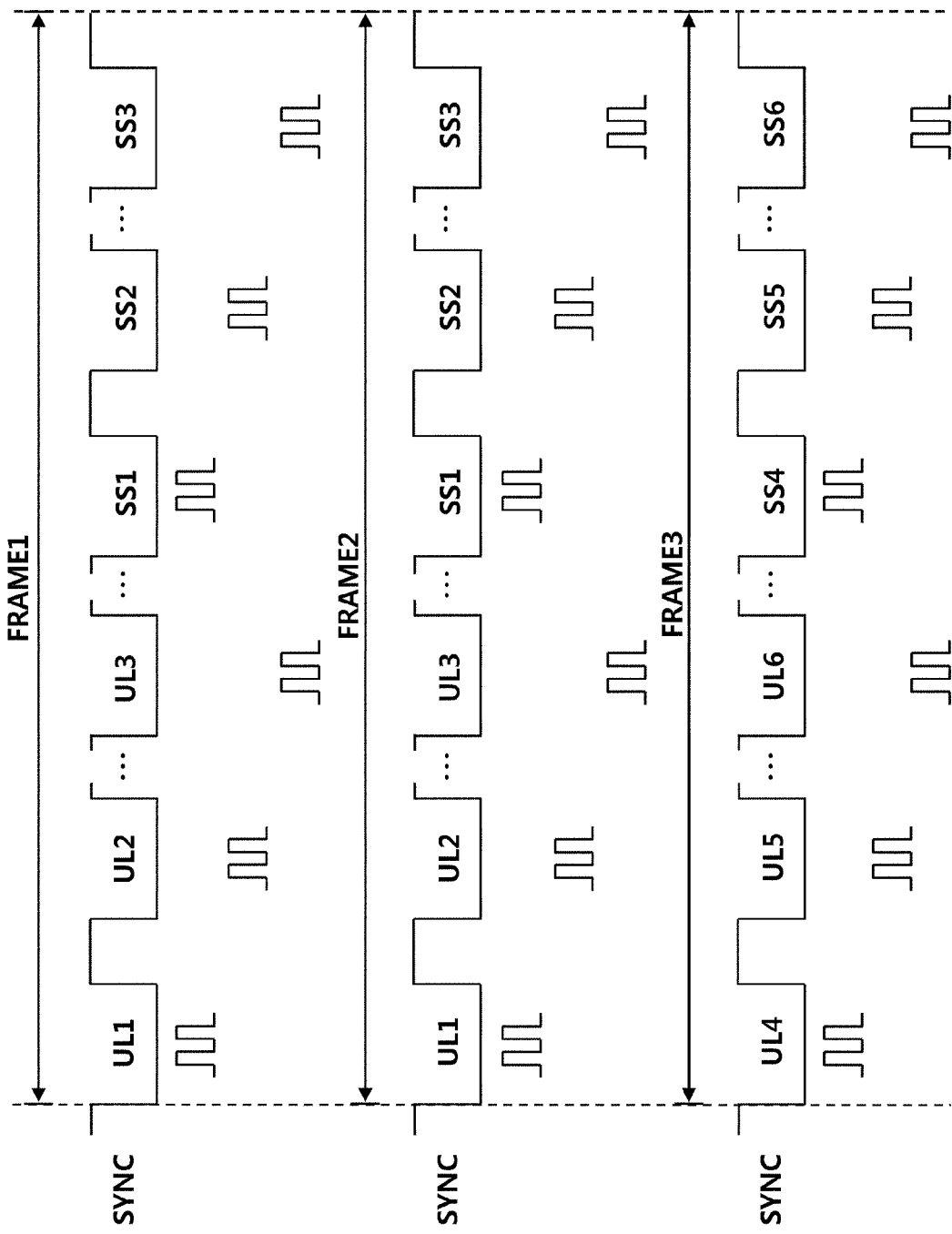
FIG. 8 is a diagram for illustrating a third method of searching for various active pens using uplink signals according to an embodiment.

FIG. 8 is a diagram illustrated in order to describe a third scheme of searching for various active pens using an uplink signal according to an embodiment.

Referring to FIG. 8, a touch sensing device according to an embodiment may search for various active pens by a third scheme indicating a combination of serial searching and parallel searching.

The sensing unit of the touch sensing device may search for all of various active pens in every frame while searching for all of various first some active pens in one frame and while searching for all of various second some active pens, which are different from the various first some active pens, in another frame. In this case, the sensing unit may search for various active pens in sequence or in a predetermined sequence in every frame while searching for various first some active pens in sequence or in a predetermined sequence in one frame and while searching for various second some active pens in sequence or in a predetermined sequence in another frame.

For example, the sensing unit may search for all of various first some active pens indicating the first to third active pens in a first frame FRAME1. After sequentially transmitting first to third uplink signals UL1 to UL3, the sensing unit may search for the first to third active pens in a plurality of subsequent touch periods (SS1 to SS3). The sensing unit may wait to receive downlink signals from the first to third active pens in sequence. The sensing unit may repeat the transmission of the first to third uplink signals UL1 to UL3 and the searching for the first to third active pens (SS1 to SS3) according to the duration of the first frame FRAME1.

Subsequently, like in the first frame FRAME1, the sensing unit may search for all of the various first some active pens including the first to third active pens in a second frame FRAME2. The repetition in the second frame FRAME2 may be optional, and may not be essential.

Subsequently, the sensing unit may search for all of various second some active pens including fourth to sixth active pens in a third frame FRAME3. After sequentially transmitting fourth to sixth uplink signals UL4 to UL6, the sensing unit may search for the fourth to sixth active pens in a plurality of subsequent touch periods (SS4 to SS6). The sensing unit may wait to receive downlink signals from the fourth to sixth active pens in sequence. The sensing unit may repeat the transmission of the fourth to sixth uplink signals UL4 to UL6 and the searching for the fourth to sixth active pens (SS4 to SS6) according to the duration of the third frame FRAME3.

Here, the order of transmitting the first to sixth uplink signals UL1 to UL6 and searching for the first to sixth active pens (SS1 to SS6) may differ in a single frame or in every frame.

Figure 9:
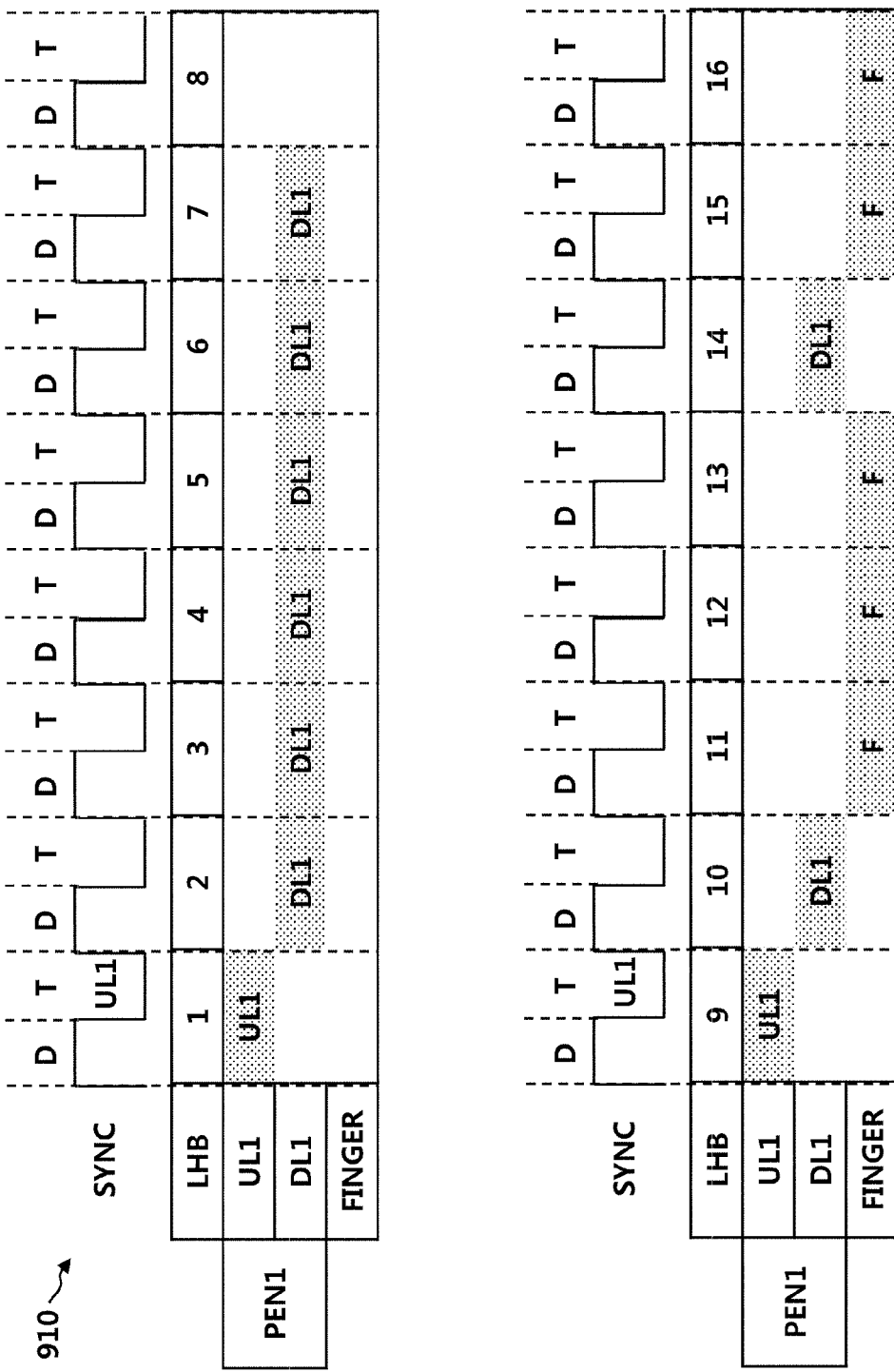
FIG. 9 is a first example for illustrating downlink information exclusively for one kind of active pen in a downlink signal according to an embodiment.
Figure 10:
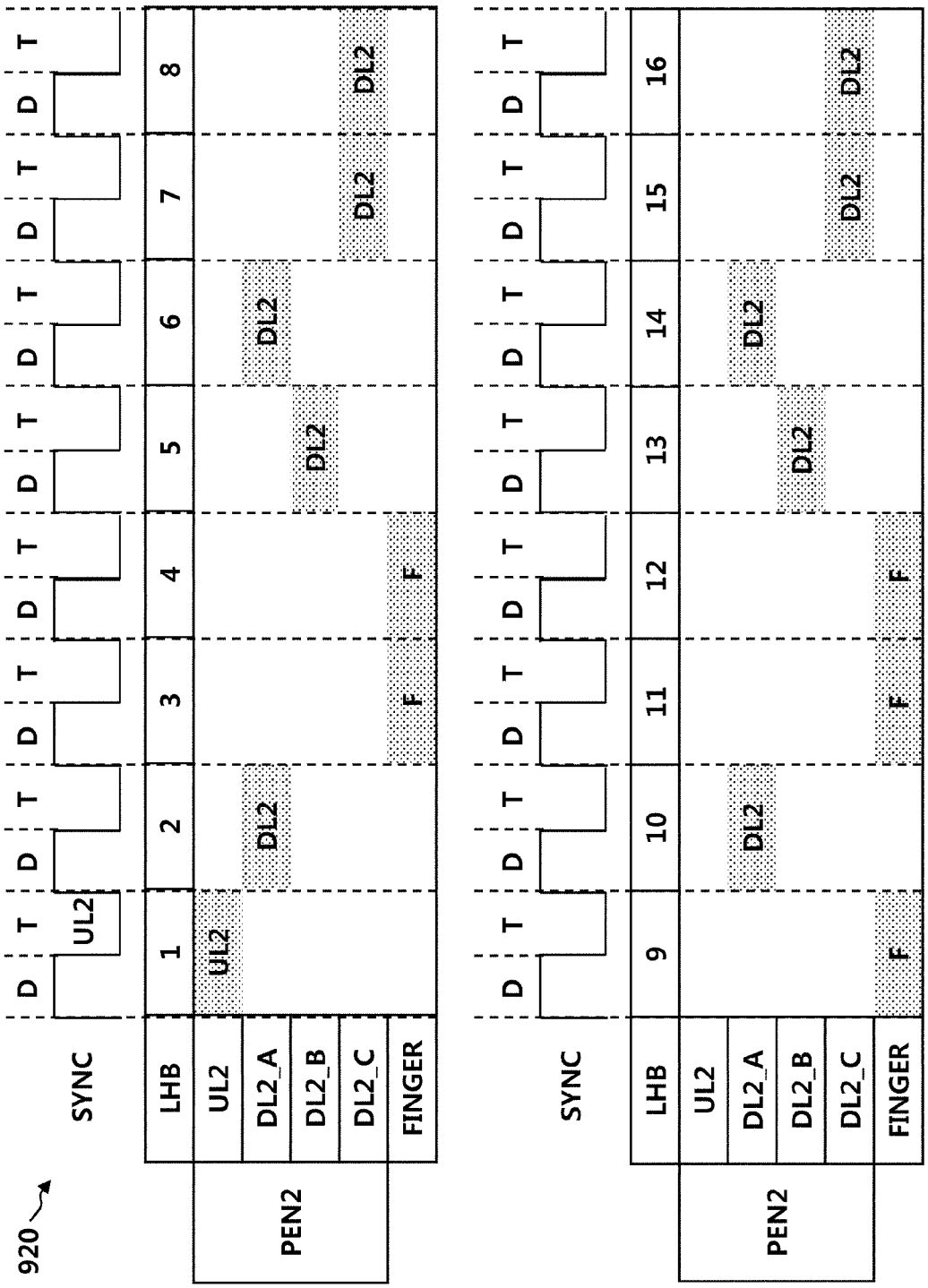
FIG. 10 is a second example for illustrating downlink information exclusively for one kind of active pen in a downlink signal according to an embodiment.

FIG. 9 is a diagram illustrating a first example describing unique downlink information of a downlink signal according to an embodiment, and FIG. 10 is a diagram illustrating a second example describing unique downlink information of a downlink signal according to an embodiment.

Referring to FIG. 9, downlink signals transmitted from various active pens to the touch sensing device may include unique downlink information. The downlink information may determine a transmission and the reception method such as a format, a frequency, or a timing of the downlink signal, and, typically, may include a protocol. The downlink information may differ depending on various active pens, and may include different protocols depending on various active pens. The downlink information may be differently configured by the manufacturer of the active pen.

Here, if the downlink information is linked to uplink information, the protocol for data communication determined by the manufacturer may define both the uplink information and the downlink information. The protocol may determine the timing of a signal, that is, the touch periods in which the uplink signal and the downlink signal are to be transmitted and received. In addition, the protocol may determine the frequencies of signals, that is, the frequency of the uplink signal and the frequency of the downlink signal, to be the same or different.

For example, a first downlink signal for a first active pen may include first downlink information 910. The first downlink information 910 may be a protocol of the first downlink signal. The first downlink information 910 may define the frequency of the first downlink signal to be 87 kHz.

The first downlink information 910 may configure a first uplink signal in $1^{st}$ and $9^{th}$ touch periods, may configure a first downlink signal in $2^{nd}$ to $7^{th}$, $10^{th}$, and $14^{th}$ touch periods, and may configure a finger in $11^{th}$ to $13^{th}$, $15^{th}$, and $16^{th}$ touch periods, among 16 touch periods (e.g., a long horizontal blank (LHB)). The synchronization signal SYNC may determine timings of the 16 touch periods along with display periods. In the diagram, the touch period may be indicated as T, and the display period may be indicated as D. Accordingly, the first active pen may be required to receive the first uplink signal and transmit the first downlink signal to conform to the touch periods defined in the first downlink information 910.

Referring to FIG. 10, another type of downlink information is illustrated.

For example, a second downlink signal for a second active pen may include second downlink information 920. The second downlink information 920 may be a protocol of the second downlink signal. The second downlink information 920 may define the frequency of the second downlink signal to be 114 kHz.

In addition, the second downlink information 920 may define various types of downlink signals. The second downlink information 920 may define the position of the active pen DL2_A, the tilt of the active pen DL2_B, and the state of the active pen DL2_C through the downlink signal.

The second downlink information 920 may configure a second uplink signal in a $1^{st}$ touch period, may configure a second downlink signal in $2^{nd}$, $5^{th}$ to $8^{th}$, $10^{th}$, and $13^{th}$ to $16^{th}$ touch periods, and may configure a finger in $3^{rd}$, $4^{th}$, $9^{th}$, $11^{th}$, and $12^{th}$ touch periods, among 16 touch periods. The synchronization signal SYNC may determine timings of the 16 touch periods along with display periods. Accordingly, the second active pen may be required to receive the second uplink signal and transmit the second downlink signal to conform to the touch periods defined in the second downlink information 920.

As described above, the touch sensing device may receive a downlink signal from any one of the various active pens on the basis of the downlink information. However, the touch sensing device may also wait previously to receive downlink signals from the various active pens on the basis of the downlink information.

Figure 11:
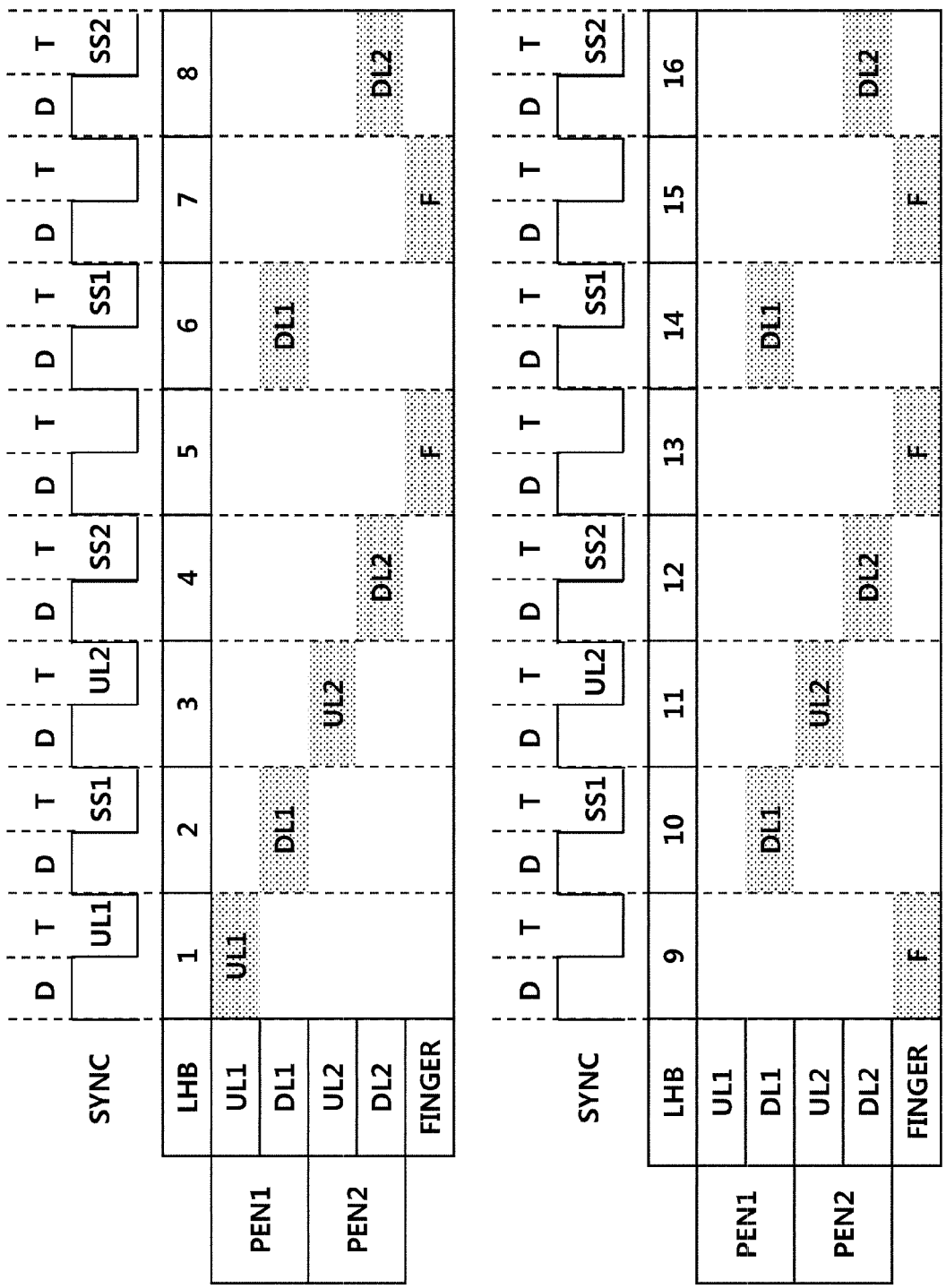
FIG. 11 is a diagram for illustrating a second method of searching various active pens using uplink signals and downlink signals according to an embodiment.

FIG. 11 is another diagram illustrated in order to describe a second scheme of searching for various active pens using an uplink signal and a downlink signal according to an embodiment.

Referring to FIG. 11, a touch sensing device according to an embodiment may search for various active pens by a second scheme indicating parallel searching while searching for various active pens in the touch period defined in the protocol of each of the various active pens. The driving unit of the touch sensing device may transmit a plurality of uplink signals to the respective active pens at different timings (for example, in different touch periods). The sensing unit of the touch sensing device may wait to receive a plurality of downlink signals from the respective active pens at different timings (for example, in different touch periods). Since a plurality of uplink signals and a plurality of downlink signals are also transmitted and received so as not to overlap each other, the searching for various active pens may be performed such that a plurality of uplink signals does not overlap.

For example, the driving unit may transmit a first uplink signal to a first active pen during a first touch period configured in first downlink information. The sensing unit may receive the first downlink signal from the first active pen during $2^{nd}$, $6^{th}$, $10^{th}$, and $14^{th}$ touch periods configured in the first downlink information.

In addition, the driving unit may transmit a second uplink signal to a second active pen during $3^{rd}$ and $11^{th}$ touch periods configured in second downlink information. The sensing unit may receive the second downlink signal from the second active pen during $4^{th}$ $8^{th}$, $12^{th}$, and $16^{th}$ touch periods configured in the second downlink information.

Accordingly, the touch sensing device may transmit respective uplink signals to conform to the protocols of various active pens, and may wait to receive respective downlink signals. As described above, the serial scheme (i.e., the first scheme) may have the advantage of being able to intensively search for a specific active pen, and the parallel scheme (i.e., the second scheme) has the advantage of preventing a delay of searching for the active pen in every frame.

What is claimed is:

1. A touch sensing device comprising:
   a driving circuit to transmit a first uplink signal corresponding to a first protocol through a touch electrode in a first touch time section and to transmit a second uplink signal corresponding to a second protocol that is different from the first protocol through the touch electrode in a second touch time section in one frame comprising a plurality of display time sections and a plurality of touch time sections; and
   a sensing circuit to wait to receive a first downlink signal corresponding to the first uplink signal in a third touch time section according to a downlink signal timing defined by the first protocol, and to wait to receive a second downlink signal corresponding to the second uplink signal in a fourth touch time section according to a downlink signal timing defined by the second protocol,
   wherein the first uplink signal and the second uplink signal have at least one of different data formats or different communication frequencies.

2. The touch sensing device of claim 1, wherein the one frame comprises 16 touch time sections, downlink signals are transmitted and received in N (N is a natural number which is 2 or higher) of the 16 touch time sections according to the first protocol, downlink signals are transmitted and received in M (M is a natural number which is 2 or higher) of the 16 touch time sections according to the second protocol, the third touch time section is selected among the N touch time sections, and the fourth touch time section is selected among the M touch time sections to not overlap with the third touch time section.

3. The touch sensing device of claim 1, wherein the driving circuit transmits the first uplink signal in a same touch time section in respective frames and the second uplink signal in a same touch time section in respective frames.

4. The touch sensing device of claim 1, wherein, when the sensing circuit receives the first downlink signal in the third touch time section, the driving circuit and the sensing circuit operate according to the first protocol in subsequent frames.

5. The touch sensing device of claim 1, wherein the downlink signal timing according to the first protocol is different from the downlink signal timing according to the second protocol.

6. The touch sensing device of claim 1, wherein, in another frame, the driving circuit transmits a third uplink signal corresponding to a third protocol in one touch time section and a fourth uplink signal corresponding to a fourth protocol in another touch time section, and the sensing circuit waits to receive a third downlink signal corresponding to the third uplink signal according to a downlink signal timing defined by the third protocol and to receive a fourth downlink signal corresponding to the fourth uplink signal according to a downlink signal timing defined by the fourth protocol.

7. The touch sensing device of claim 1, wherein each frame comprises 16 touch time sections and the sensing circuit senses a touch or a proximity of an external object to a panel in some of the 16 touch time sections.

* * * * *